(12) United States Patent  
Chou (10) Patent No.: US 10,025,442 B2  
(45) Date of Patent: Jul. 17, 2018

(54) CAPACITIVE FINGERPRINT SENSOR

(71) Applicant: Taiwan Semiconductor Manufacturing Co., Ltd., Hsin-Chu (TW)

(72) Inventor: Cheng San Chou, Hsin-Chu (TW)

(73) Assignee: Taiwan Semiconductor Manufacturing Co., Ltd., Hsin-Chu (TW)

(*) Notice: Subject to any disclaimer, the term of this patent is extended or adjusted under 35 U.S.C. 154(b) by 37 days.

(21) Appl. No.: 15/370,191

(22) Filed: Dec. 6, 2016

(65) Prior Publication Data

US 2017/0336890 A1  Nov. 23, 2017

Related U.S. Application Data

(60) Provisional application No. 62/339,204, filed on May 20, 2016.

(51) Int. Cl.
  G06F 3/00  (2006.01)
  G06F 3/044  (2006.01)

(52) U.S. Cl.
  CPC .................. *G06F 3/044* (2013.01)

(58) Field of Classification Search
  CPC .................................................. G06F 3/044
  See application file for complete search history.

(56) References Cited

U.S. PATENT DOCUMENTS

| | | | | |
|---|---|---|---|---|
| 5,940,526 A | * | 8/1999 | Setlak | G06K 9/0002 382/124 |
| 6,284,561 B1 | * | 9/2001 | Hung | G06K 9/0002 257/E21.576 |
| 7,298,875 B2 | | 11/2007 | Kim et al. | |
| 8,987,059 B2 | | 3/2015 | Liang et al. | |
| 9,024,910 B2 | * | 5/2015 | Stephanou | G06F 3/0414 345/173 |
| 9,040,334 B2 | | 5/2015 | Chu et al. | |
| 9,065,358 B2 | | 6/2015 | Tsai et al. | |
| 9,085,455 B2 | | 7/2015 | Cheng et al. | |
| 9,085,456 B2 | | 7/2015 | Tsai et al. | |
| 9,122,827 B2 | | 9/2015 | Chen et al. | |
| 9,133,017 B2 | | 9/2015 | Liang et al. | |
| 9,138,994 B2 | | 9/2015 | Peng et al. | |
| 9,139,420 B2 | | 9/2015 | Chang et al. | |
| 9,139,423 B2 | | 9/2015 | Chien et al. | |
| 9,181,083 B2 | | 11/2015 | Tsai et al. | |
| 9,187,317 B2 | | 11/2015 | Cheng et al. | |

(Continued)

*Primary Examiner* — Muhammad N Edun  
(74) *Attorney, Agent, or Firm* — Eschweiler & Potashnik, LLC (57) ABSTRACT

The present disclosure relates to a capacitive fingerprint sensor having an air gap, which is disposed under a sensing electrode and that is configured to improve sensing sensitivity by reducing a parasitic capacitance of the capacitive fingerprint sensor, and an associated method. In some embodiments, the capacitive fingerprint sensor includes a plurality of semiconductor devices disposed over a substrate. An interconnect structure is disposed over the semiconductor devices. A sensing electrode is disposed over the interconnect structure to form a capacitance between the sensing electrode and finger skins. An air gap is disposed under the sensing electrode and enclosed by the sensing electrode and the interconnect structure.

20 Claims, 4 Drawing Sheets

(56) References Cited

U.S. PATENT DOCUMENTS

| | | |
|---|---|---|
| 9,233,839 B2 | 1/2016 | Liu et al. |
| 9,236,877 B2 | 1/2016 | Peng et al. |
| 9,238,581 B2 | 1/2016 | Wu et al. |
| 2014/0287548 A1 | 9/2014 | Lin et al. |
| 2015/0137303 A1 | 5/2015 | Chou et al. |
| 2015/0175405 A1 | 6/2015 | Cheng |
| 2015/0175407 A1 | 6/2015 | Cheng et al. |
| 2015/0196912 A1 | 7/2015 | Tsai et al. |
| 2016/0026846 A1* | 1/2016 | Lin ................. G06K 9/0002 382/124 |
| 2017/0270336 A1* | 9/2017 | Setlak .............. G06K 9/0002 |

* cited by examiner

CAPACITIVE FINGERPRINT SENSOR

REFERENCE TO RELATED APPLICATION

This application claims priority to U.S. Provisional Application No. 62/339,204 filed on May 20, 2016, the contents of which are incorporated by reference in their entirety.

BACKGROUND

Capacitive fingerprint sensors have become increasingly common in electronic devices (e.g., cell phones, sensors, etc.) for security and authentication systems. Fingerprints are detailed and nearly unique, making them suitable as markers of human identity. A capacitive fingerprint sensor recognizes a fingerprint by detecting capacitance variations between an embedded electrode and ridges and valleys that make up the fingerprint.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A capacitive fingerprint sensor detects a sensing capacitance of an equivalent sensing capacitor formed between the skin of a finger and a metal sensing electrode embedded within the fingerprint sensor to acquire a fingerprint image. To protect the metal sensing electrode and other components of the fingerprint sensor, a covering layer is attached to the fingerprint sensor through a glue material. The covering layer and the glue material are disposed between the metal sensing electrode and the finger skin and act as a portion of a dielectric of the equivalent sensing capacitor to be detected. Due to the thickness of the covering layer, the sensing capacitance is limited (since capacitance is inversely proportional to a distance between electrodes). It has been appreciated that the limited sensitivity of the fingerprint sensor may be adversely affected by a parasitic capacitance formed between the metal sensing electrode and its surroundings, including interconnect layers and devices disposed underneath the metal sensing electrode. The parasitic capacitance acts as a background disturbance and introduces noise into the sensing signal.

The present disclosure relates to a capacitive fingerprint sensor that comprises an air gap, which is disposed under a sensing electrode and that is configured to improve sensing sensitivity by reducing a parasitic capacitance of the capacitive fingerprint sensor, and an associated method. In some embodiments, the capacitive fingerprint sensor comprises a plurality of semiconductor devices disposed over a substrate. An interconnect structure is disposed over the semiconductor devices. A sensing electrode is disposed over the interconnect structure. The sensing electrode is configured to detect a capacitance between the sensing electrode and the skin of an overlying finger. An air gap is disposed under the sensing electrode and is enclosed by the sensing electrode and the interconnect structure. By having the air gap arranged under the sensing electrode (rather than arranging the sensing electrode directly on passivation layers or the interconnect structure) the parasitic capacitance is reduced and the signal to noise ratio of the capacitive fingerprint sensor is enhanced. This enhancement allows for more flexibility to the choice of covering material and its thickness, i.e., the thickness of the covering material can be increased and still achieve comparable or even better signal to noise ratio.

Figure 1:
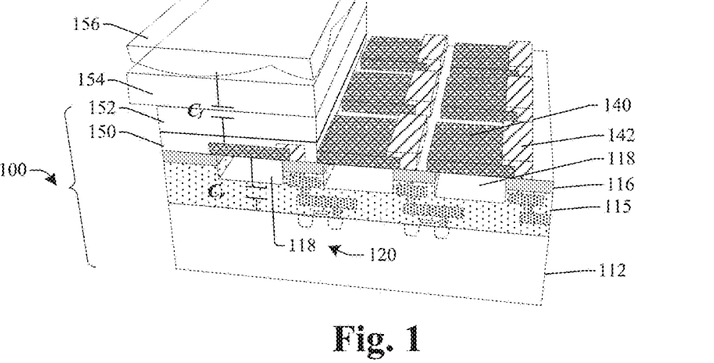
FIG. 1 illustrates a perspective view of some embodiments of an integrated circuit including a fingerprint sensing device having an air gap under a sensing electrode.

FIG. 1 illustrates a perspective view of some embodiments of an integrated circuit including a fingerprint sensing device 100. As shown in FIG. 1, an interconnect structure 115 is disposed over a substrate 112. The interconnect structure 115 comprises a plurality of metal interconnect layers arranged within a dielectric structure disposed over a substrate 112.

The fingerprint sensing device 100 comprises a sensing pixel array disposed over the interconnect structure 115. The sensing pixel array comprises a plurality of sensing electrodes 140 arranged in a row direction and a column direction perpendicular to the row direction. In some embodiments, the sensing electrodes 140 may be separated from the interconnect structure 115 by way of a passivation layer 116. The plurality of sensing electrodes 140 are coupled to an underneath processing circuitry, including semiconductor devices 120, by way of the metal interconnect layers within the interconnect structure 115. In some embodiments, the plurality of sensing electrodes 140 may be coupled to the metal interconnect layers by way of a metal film 142 that extends along sidewalls and an upper surface of the sensing electrodes 140.

A passivation layer 150 and a protective structure is arranged over the sensing electrodes 140. In some embodiments, the protective structure may comprise a covering layer 154 arranged over the sensing electrodes 140. In some embodiments, the protective structure may further comprise a glue layer 152 arranged between the covering layer 154 and the sensing electrodes 140. The covering layer 154 has an upper surface that may be exposed to an external environment. This allows for the covering layer 154 and the glue layer 152 to be disposed between the skin of a finger 156 and the sensing electrodes 140.

During operation, the sensing electrodes 140 are capacitively coupled to ridges and valleys within the skin of the finger 156 to generate a capacitive signal of an equivalent sensing capacitor $C_f$ that forms a pixel of the resulting fingerprint image. The sensing electrodes 140 act as lower electrodes of the sensing capacitors $C_f$, and the finger 156 acts as upper electrodes of the sensing capacitors $C_f$. The covering layer 154 and the glue layer 152 act as capacitor dielectrics of the sensing capacitors $C_f$. In some embodiments, the covering layer 154 may have a thickness that results in a relatively small sensing capacitor $C_f$. As an example, for illustration but non-limiting purpose, the sensing capacitor $C_f$ may be smaller than 0.1 femtofarad (fF) with a thickness of the covering layer 154 greater than 500 µm.

The sensing electrodes 140 are also capacitively coupled to the substrate 112 and the interconnect structure 115, resulting in a capacitive noise of an equivalent parasitic capacitor $C_p$. The parasitic capacitor $C_p$ may degrade the quality of a fingerprint image to be detected. For example, performance of the fingerprint sensing device 100 may be characterized by a figure of merit valued by a ratio of $C_f/C_p$. Accordingly, the parasitic capacitor $C_p$ is negatively correlated to the sensitivity of the fingerprint sensing device 100.

An array of air gaps 118 are disposed directly under the sensing electrodes 140. The air gaps 118 may be filled with an inert gas, like argon or nitrogen. The air gaps 118 have a dielectric constant that is lower than the surrounding interconnect structure and/or the overlying passivation layer 116. For example, the air gaps 118 may have a dielectric constant close to 1, while the interconnect structure 115 and the overlying passivation layer 116 may have dielectric constants three to four times greater. Therefore, by recessing the interconnect structure 115 and/or the passivation layer 116 under the sensing electrodes 140, the parasitic capacitor $C_p$ is reduced. For example, the parasitic capacitor $C_p$ may be in a range of 3 fF to 5 fF with a depth of the air gaps 118 around 3 µm. Reducing the parasitic capacitor $C_p$ reduces noise and improves sensitivity of the fingerprint sensing device 100.

Figure 2:
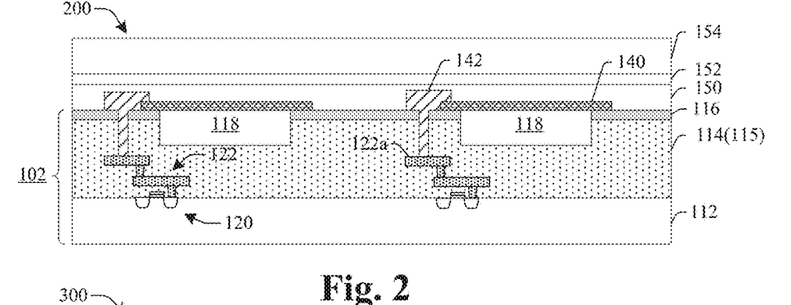
FIG. 2 illustrates a cross-sectional view of some embodiments of an integrated circuit including a fingerprint sensing device having an air gap under a sensing electrode.

FIG. 2 illustrates a cross-sectional view of some embodiments of a fingerprint sensing device 200 having an air gap 118 disposed under a sensing electrode 140. In some embodiments, the fingerprint sensing device 200 comprises a plurality of semiconductor devices 120 disposed over a substrate 112. The plurality of semiconductor devices 120 are configured to receive and process a capacitive signal. In some embodiments, the plurality of semiconductor devices 120 may comprise complementary metal-oxide semiconductor (CMOS) devices that are configured to provide such functions as analog-to-digital conversion, amplification, storage, filtering, etc. In some embodiments, the substrate 112 can be a bulk semiconductor wafer such as a silicon wafer that is lightly doped. The substrate 112 can also be implemented as a binary compound substrate (e.g., GaAs wafer), a ternary compound substrate (e.g., AlGaAs), or higher order compound wafers, among others. Further, the substrate 112 can also include non-semiconductor materials such as oxide in silicon-on-insulator (SOI), partial SOI substrate, polysilicon, amorphous silicon, or organic materials, among others. In some embodiments, the substrate 112 can include multiple wafers or dies which are stacked or otherwise adhered together.

An interconnect structure 115 is disposed over the semiconductor devices 120 and the substrate 112. The interconnect structure 115 may comprise a plurality of metal interconnect layers 122 including metal wire lines and vias disposed within a plurality of dielectric layers of a dielectric structure 114. The plurality of metal interconnect layers 122 may comprise conductive metal materials such as copper, aluminum, tungsten, etc. The plurality of dielectric layers of the dielectric structure 114 may comprise a plurality of inter-level dielectric (ILD) layers comprising one or more of a low-k dielectric layer, an ultra-low-k dielectric layer, an extreme low-k dielectric layer, and/or a silicon dioxide layer.

A passivation layer 116 is disposed over the interconnect structure 115. The passivation layer 116 is configured to protect underlying layers from damage during and after fabrication of the fingerprint sensing device 200. In some embodiments, the passivation layer 116 may comprise silicon dioxide. In some embodiments, the passivation layer 116 may comprise silicon nitride. In some other embodiments, the passivation layer 116 comprises high density plasma dielectric layers, for example a high density plasma oxide layer.

In some embodiments, an air gap 118 is disposed through the passivation layer 116 into one or more of the dielectric layers of the dielectric structure 114. A sensing electrode 140 is disposed over the interconnect structure 115 and overlying the air gap 118. The sensing electrode 140 is configured as a lower electrode plate of a sensing capacitor to generate a capacitive signal with a conductive object (e.g. finger skins) overlying the fingerprint sensing device 200. In some embodiments, the sensing electrode 140 may comprise heavily doped polysilicon and/or other doped layer of semiconductor material. In other embodiments, the sensing electrode 140 may comprise an alternative conductive material, such as a metal (e.g., aluminum, copper, etc.). The sensing electrode 140 may be electrically connected to the semiconductor devices 120 through the metal interconnect layers 122. The air gap 118 has a dielectric constant smaller than dielectric constants of the dielectric layers of the dielectric structure 114 and the passivation layer 116, such that the parasitic capacitance, i.e., the noise, is reduced with the air gap 118 replacing a portion of the dielectric layers of the dielectric structure 114 and the passivation layer 116.

In some embodiments, a peripheral region of the sensing electrode 140 is in direct contact with the passivation layer 116. In some embodiments, the air gap 118 has a vertical depth from a top surface of the plurality of dielectric layers of the dielectric structure 114 that is shallower than a top metal interconnect layer 122a, such that the plurality of metal interconnect layers 122 are not exposed to the air and protected from damage. In some alternative embodiments not shown by FIG. 2, the air gap 118 can be arranged within or through the passivation layer 116 and stops on the top surface of the plurality of dielectric layers of the dielectric structure 114. In some embodiments, a metal film 142 may be disposed on an upper surface of the passivation layer 116, along a sidewall surface of the sensing electrode 140, and extending to cross over the sensing electrode 140. The metal film 142 may extend through the passivation layer 116 into the dielectric layers of the dielectric structure 114 to reach on a metal interconnect layer 122, for example, the top metal interconnect layer 122a. The metal film 142 may comprise copper. In some embodiments, a passivation layer 150 and a glue layer 152 may be arranged over the metal film 142 and the sensing electrode 140, configured to attach a covering layer 154 to the sensing substrate 102.

Figure 3:
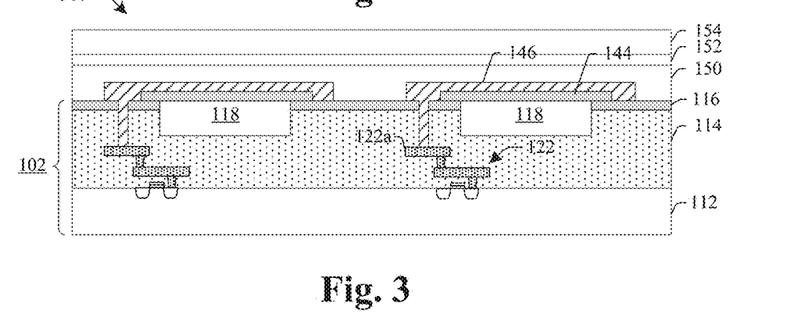
FIG. 3 illustrates a cross-sectional view of some alternative embodiments of an integrated circuit including a fingerprint sensing device having an air gap under a sensing electrode.

FIG. 3 illustrates a cross-sectional view of some alternative embodiments of a fingerprint sensing device 300 having an air gap 118 under a sensing electrode 146. The fingerprint sensing device 300 comprises a plurality of semiconductor devices 120 arranged within a substrate 112. The plurality of semiconductor devices 120 is configured to receive and process a capacitive signal received from a sensing electrode 146. In some embodiments, the sensing electrode 146 is made of a metal film. The sensing electrode 146 may extend through a passivation layer 116 and reach on a top metal interconnect layer 122a of the plurality of the metal interconnect layers 122. A support layer 144 can be disposed between the sensing electrode 146 and the passivation layer 116 to enclose the air gap 118. In some embodiments, the sensing electrode 146 covers top and sidewall surfaces of the support layer 144. In some embodiments, the support layer 144 comprises dielectric materials such as silicon dioxide. In some embodiments, a glue layer 152 may be arranged over the metal film 142 and the sensing electrode 146 and the passivation layer 116, configured to attach a covering layer 154 to the sensing substrate 102.

FIGS. 4-10 illustrate some embodiments of cross-sectional views 400-1000 showing a method of forming an integrated circuit including a fingerprint sensing device having an air gap under a sensing electrode.

Figure 4:
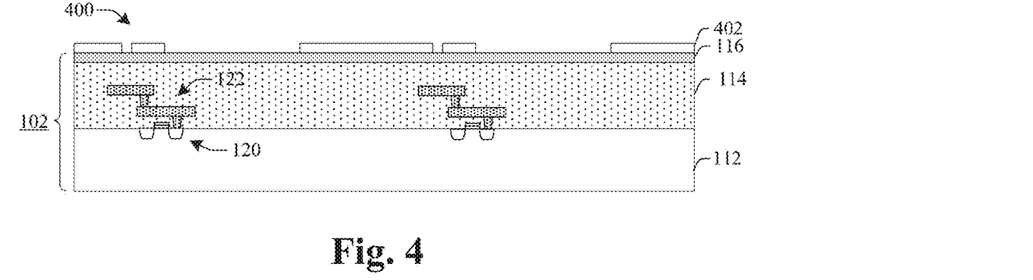
FIGS. 4-10 illustrate some embodiments of cross-sectional views showing a method of forming an integrated circuit including a fingerprint sensing device having an air gap under a sensing electrode.

As shown in cross-sectional view 400 of FIG. 4, a substrate 112 is provided. In various embodiments, the substrate 112 may comprise any type of semiconductor body (e.g., silicon/CMOS bulk, SiGe, SOI, etc.) such as a semiconductor wafer or one or more die on a wafer, as well as any other type of semiconductor and/or epitaxial layers formed thereon and/or otherwise associated therewith. In some embodiments, a plurality of semiconductor devices 120 and a plurality of metal interconnect layers 122 (arranged within a dielectric structure 114 comprising one or more inter-level dielectric (ILD) layers) can be formed over the substrate 112 to form a sensing substrate 102. The plurality of metal interconnect layers 122 may be formed by forming trench and via openings within an ILD layer of the dielectric structure 114, which is selectively exposed to an etchant (e.g., $CF_4$, $CHF_3$, $C_4F_8$, HF, etc.) that etches the ILD layer, followed by filling a conductive metal material such as copper, aluminum, tungsten, etc. into the trench and via openings. In some embodiments, a chemical mechanical polishing (CMP) process may be used to remove excess portions of the metal material from an upper surface of the ILD layer.

A passivation layer 116 is formed over the dielectric structure 114. The passivation layer 116 may be formed by way of a deposition process (e.g., chemical vapor deposition (CVD), physical vapor deposition (PVD), atomic layer deposition (ALD), etc.). In some embodiments, the passivation layer 116 may be formed by way of a plasma enhanced chemical vapor deposition (PECVD) process. In some embodiments, a hard mask layer 402 is formed over the passivation layer 116. The hard mask layer 402 may be formed by way of a deposition process and then be patterned by a photoresist mask using a lithography process.

Figure 5:
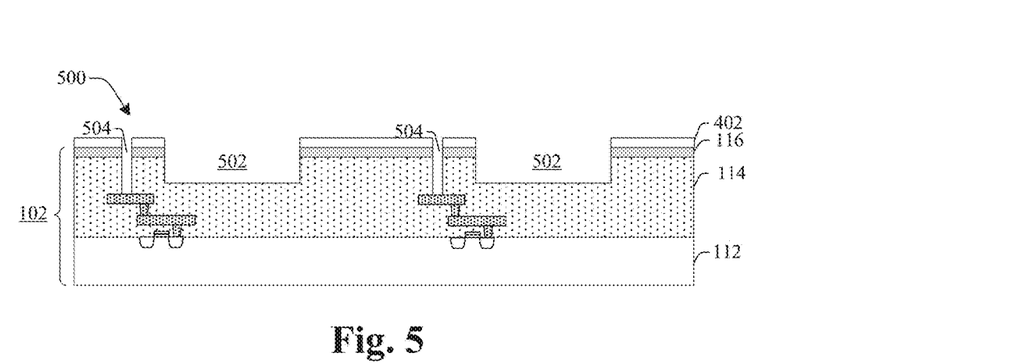

As shown in cross-sectional view 500 of FIG. 5, the passivation layer 116 is patterned by the hard mask layer 402 to form a trench 502 and a via hole 504. The trench 502 is formed at a position where a sensing electrode will overly in a later stage of manufacturing. The via hole 504 is formed to reach on the metal interconnect layer 122. The hard mask layer 402 is subsequently removed. The patterning process may comprise an etching process, which may include a dry etching process (e.g., using a plasma etchant, a RIE etchant, etc.) or a wet etching process (e.g., using hydrofluoric acid (HF)). In some embodiments, the trench 502 and/or the via hole 504 are formed through the passivation layer 116 by the etching process.

Figure 6:
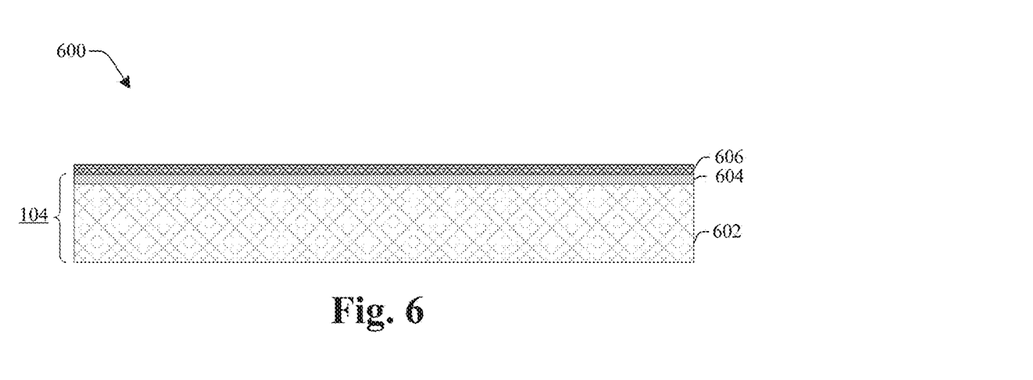

As shown in cross-sectional view 600 of FIG. 6, a dummy substrate 104 is prepared. In some embodiments, the dummy substrate 104 is prepared by forming a dielectric layer 604 over a semiconductor substrate 602. In some embodiments, the dielectric layer 604 comprises an oxide (e.g., $SiO_2$) formed by way of a thermal process. In other embodiments, the dielectric layer 604 comprises an oxide (e.g., $SiO_2$) formed by way of a deposition process (e.g., chemical vapor deposition (CVD), physical vapor deposition (PVD), atomic layer deposition (ALD), etc.). In some embodiments, a conductive layer 606 is formed over the dielectric layer 604. The conductive layer 606 can comprise polycrystalline silicon formed by a PVD or CVD process, such as low pressure chemical vapor deposition (LPCVD), plasma-enhanced chemical vapor deposition (PECVD) or an atmospheric pressure chemical vapor deposition (APCVD) growth process.

Figure 7:
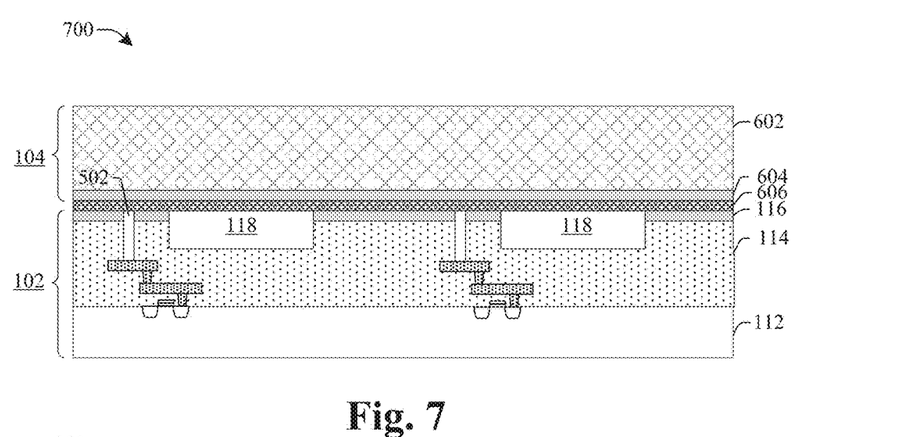

As shown in cross-sectional view 700 of FIG. 7, the dummy substrate 104 is bonded to the sensing substrate 102, enclosing an air gap 118 therebetween. The dummy substrate 104 may be bonded to the sensing substrate 102 by a fusion bonding process between the conductive layer 606 and the passivation layer 116. In some other embodiments, the dummy substrate 104 may be bonded to the sensing substrate 102 by a semiconductor-to-metal bonding between a semiconductor material and a metal material. In some embodiments, the semiconductor material includes at least one of germanium, silicon, silicon germanium or another semiconductor material. In some embodiments, the metal material includes at least one of aluminum (Al), copper (Cu), titanium (Ti), tantalum (Ta), gold (Au), nickel (Ni), stannum (Sn), or another metal. In some further embodiments, the dummy substrate 104 is bonded to the sensing substrate 102 by eutectic bonding between two metal materials each including at least one of Al, Cu, Ti, Ta, Au, Ni, Sn, or another metal. The materials to be bonded are pressed against each other in an annealing process to form a eutectic phase of the materials.

Figure 8:
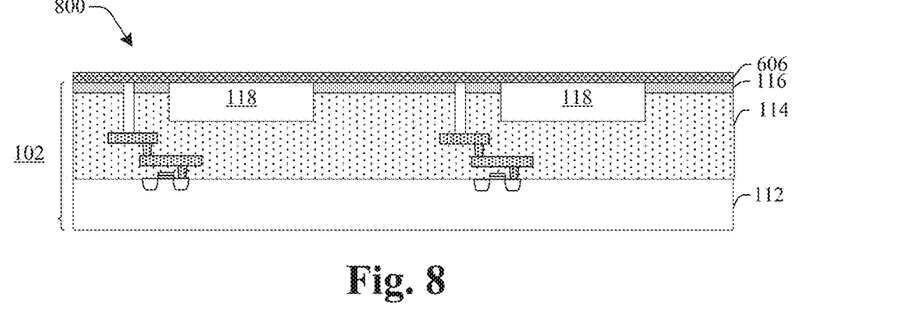

As shown in cross-sectional view 800 of FIG. 8, the semiconductor substrate 602 of the dummy substrate 104 is removed from a back side opposite to a bonding interface. The passivation layer 116 may also be removed. In some embodiments, the dummy substrate 104 is removed by a chemical mechanical polishing (CMP) process or a mechanical grinding process followed by additional cleaning processes. The removal process may also include a dry etching process (e.g., using a plasma etchant, a RIE etchant, etc.) or a wet etching process (e.g., using hydrofluoric acid (HF)).

Figure 9:
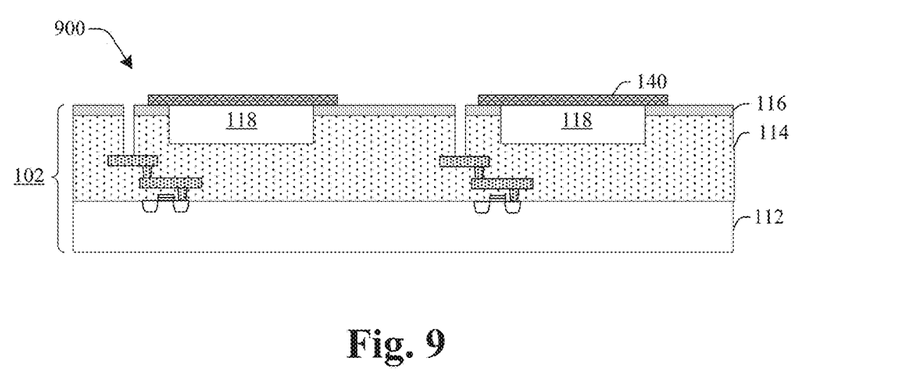

As shown in cross-sectional view 900 of FIG. 9, the conductive layer 606 (shown in FIG. 8) is patterned to form an array of sensing electrodes 140. The conductive layer 606 can be patterned according to a hard mask, which may be formed by way of a deposition process and then be patterned by a photoresist mask using a lithography process. The sensing electrodes 140 respectively overly the air gap 118.

Figure 10:
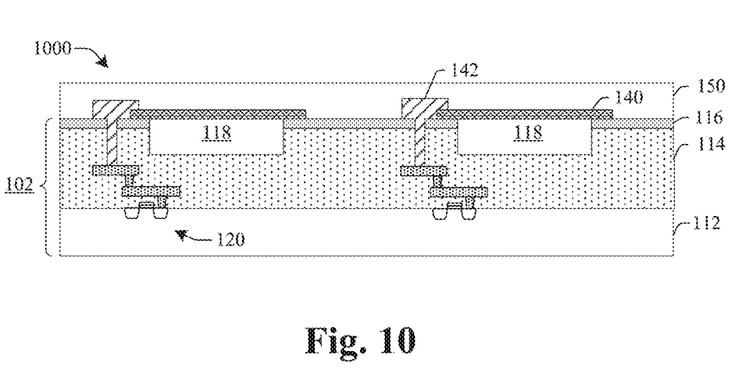

As shown in cross-sectional view 1000 of FIG. 10, a metal film 142 is formed to fill the via holes 504 (shown in FIG. 5) and electrically connect the sensing electrodes 140 and the semiconductor devices 120 within the sensing substrate 102. The metal film 142 can be formed by depositing a metal material over the passivation layer 116 followed by a patterning process. In some embodiments, the metal film 142 can be formed and patterned to be in direct contact with the sensing electrodes 140 and on a peripheral region of the sensing electrodes 140. In some alternative embodiments not shown by FIG. 10, the metal film 142 can be formed and patterned to cover top and sidewall surfaces of the sensing electrodes 140. In some further alternative embodiments corresponding to FIG. 3, the conductive layer 606 shown in FIG. 6 can be left out. The dielectric layer 604 is kept after the removal of the semiconductor substrate 602 (similar removal process shown in FIG. 8), and patterned to be at positions where the presented sensing electrodes 140 locate (similar patterning process shown in FIG. 9). The metal film 142 is patterned to overly the air gap 118 and functions as the sensing electrode in these alternative embodiments. A passivation layer 150 is then formed over the metal film 142 and/or the sensing electrode 140.

Figure 11:
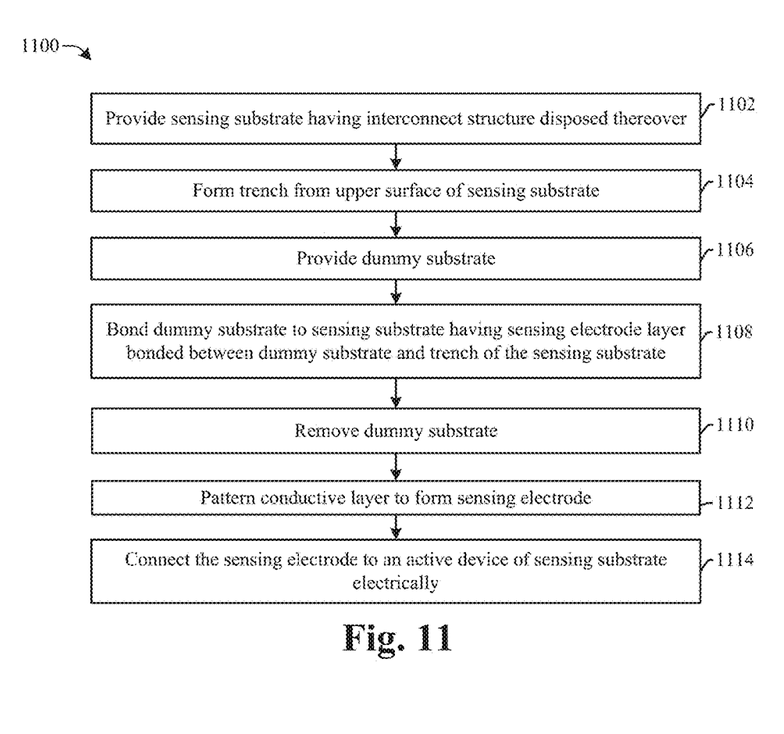
FIG. 11 illustrates a flow diagram of some embodiments of a method of forming an integrated circuit including a fingerprint sensing device having an air gap under a sensing electrode.

FIG. 11 illustrates a flow diagram of some embodiments of a method of forming an integrated circuit including a fingerprint sensing device having an air gap under a sensing electrode.

Although method 1100 is described in relation to FIGS. 4-10, it will be appreciated that the method 1100 is not limited to such structures disclosed in FIGS. 4-10, but instead may stand alone independent of the structures disclosed in FIGS. 4-10. Similarly, it will be appreciated that the structures disclosed in FIGS. 4-10 are not limited to the method 1100, but instead may stand alone as structures independent of the method 1100. Also, while method 1100 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 1102, a sensing substrate is provided. A plurality of semiconductor devices can be formed within the sensing substrate. A plurality of metal interconnect layers is formed within a plurality of ILD layers. A passivation layer is then formed over the sensing substrate to protect the sensing substrate from damage. A hard mask layer may be formed and patterned over the passivation layer. FIG. 4 illustrates some embodiments of a cross-sectional view 400 corresponding to act 1102.

At 1104, a trench is formed from an upper surface of the sensing substrate. In some embodiments, the trench is formed according to the patterned hard mask layer by etching through the passivation layer. The trench may have a bottom surface coplanar with a bottom surface of the passivation layer or lower than the bottom surface of the passivation layer. In some embodiments, the trench is formed into the ILD layers to a position higher than a top metal interconnect layer. FIG. 5 illustrates some embodiments of a cross-sectional view 500 corresponding to act 1104.

At 1106, a dummy substrate is provided. In some embodiments, the dummy substrate is prepared by forming a dielectric layer over a semiconductor substrate followed by forming a conductive layer used as a precursor material of sensing electrodes to be formed in a later stage of manufacturing. In some other embodiments, the conductive layer can be omitted, and the dielectric layer would act as a support layer and not be removed during a dummy substrate removal process. FIG. 6 illustrates some embodiments of a cross-sectional view 600 corresponding to act 1106.

At 1108, the dummy substrate is bonded to the sensing substrate. The conductive layer and/or the dielectric layer are bonded between the dummy substrate and the trench of the sensing substrate, enclosing an air gap between the ILD layers and the conductive layer or the dielectric layer. FIG. 7 illustrates some embodiments of a cross-sectional view 700 corresponding to act 1108.

At 1110, the dummy substrate is removed from the back side, leaving the conductive layer or the dielectric layer attached to the sensing substrate. In some embodiments, the dummy substrate is removed by a chemical mechanical polishing (CMP) process. The removal process may also include a dry etching process and/or a wet etching process. FIG. 8 illustrates some embodiments of a cross-sectional view 800 corresponding to act 1110.

At 1112, the conductive layer or the dielectric layer is patterned to form a sensing electrode or an electrode support layer. FIG. 9 illustrates some embodiments of a cross-sectional view 900 corresponding to act 1112.

At 1114, a metal layer is formed and patterned over the sensing electrode or the electrode support layer. In some embodiments, the metal layer electrically connects the sensing electrode to the semiconductor devices within sensing substrate. In some other embodiments, the metal layer is patterned to cover the electrode support layer and acts as sensing electrodes. FIG. 10 illustrates some embodiments of a cross-sectional view 1000 corresponding to act 1114.

Therefore, the present disclosure relates to a capacitive fingerprint sensor that comprises an air gap disposed under a sensing electrode and configured to improve sensing sensitivity by reducing the parasitic capacitance, and an associated method.

In some embodiments, the present disclosure relates to integrated circuit including a fingerprint sensing device. The integrated circuit comprises a plurality of semiconductor devices disposed within a substrate and configured to receive and process a capacitive signal. The integrated circuit further comprises an interconnect structure disposed over the semiconductor devices, comprising a plurality of metal interconnect layers disposed within a plurality of interconnect dielectric layers. The integrated circuit further comprises a sensing electrode disposed over the interconnect structure, configured as an electrode plate to generate a capacitive signal with a conductive object overlying the fingerprint sensing device. The integrated circuit further comprises an air gap enclosed between the sensing electrode and the interconnect structure.

In other embodiments, the present disclosure relates to integrated circuit including a fingerprint sensing device. The integrated circuit comprises a plurality of semiconductor devices disposed within a substrate and configured to receive and process a capacitive signal. The integrated circuit further comprises an interconnect structure disposed over the CMOS devices and the sensing substrate, comprising a plurality of metal interconnect layers disposed within a plurality of interconnect dielectric layers. The integrated circuit further comprises a sensing electrode disposed over the interconnect structure and a passivation layer disposed over the interconnect structure. The integrated circuit further comprises an air gap disposed under the sensing electrode, enclosed by the sensing electrode and the interconnect structure. The fingerprint sensing device is configured to detect the capacitive signal between the sensing electrode and a conductive object overlying the fingerprint sensing device.

In yet other embodiments, the present disclosure relates a method of forming a fingerprint sensing device. The method comprises providing a sensing substrate having a plurality of semiconductor devices disposed thereon and configured to receive and process a capacitive signal. The method further comprises forming an interconnect structure including a plurality of metal lines and vias within a plurality of inter-metal dielectric layers over the sensing substrate and performing a patterning process to form a trench from an upper surface of the interconnect structure. The method further comprises forming a sensing electrode overlying the trench of the sensing substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit including a fingerprint sensing device, comprising:
    a plurality of semiconductor devices disposed within a substrate;
    an interconnect structure disposed over the semiconductor devices and comprising a plurality of metal interconnect layers disposed within a dielectric structure having a plurality of interconnect dielectric layers;
    a sensing electrode disposed over the interconnect structure and configured generate a capacitive signal with a conductive object overlying the fingerprint sensing device; and
    an air gap enclosed between the sensing electrode and the interconnect structure.

2. The integrated circuit of claim 1, further comprising:
    a passivation layer disposed over the interconnect structure and in direct contact with the sensing electrode.

3. The integrated circuit of claim 2, wherein the passivation layer comprises silicon dioxide film bonded to the sensing electrode.

4. The integrated circuit of claim 1, wherein the sensing electrode comprises polycrystalline silicon.

5. The integrated circuit of claim 1, wherein the dielectric structure arranged between a top metal interconnect layer and the air gap.

6. The integrated circuit of claim 1, wherein the air gap has a vertical depth of around 3 μm.

7. The integrated circuit of claim 1, wherein the air gap is disposed within a recessed upper surface of the interconnect structure.

8. The integrated circuit of claim 1, further comprising:
    a metal film overlying the interconnect structure, wherein the metal film extends along a sidewall surface of the sensing electrode, and further extends on a top surface of the sensing electrode.

9. The integrated circuit of claim 8, wherein the metal film electrically couples the sensing electrode to the semiconductor devices through the interconnect structure.

10. The integrated circuit of claim 1, further comprising:
    a covering layer attached to the sensing electrode through a glue material.

11. An integrated circuit including a fingerprint sensing device, comprising:
    a plurality of CMOS devices disposed over a substrate and configured to receive and process a capacitive signal;
    an interconnect structure disposed over the CMOS devices and the substrate and comprising a plurality of metal interconnect layers disposed within a plurality of interconnect dielectric layers;
    a passivation layer disposed over the interconnect structure;
    a sensing electrode disposed over the passivation layer; and
    an air gap disposed under the sensing electrode and having sidewalls comprising the interconnect structure and the passivation layer;
    wherein the fingerprint sensing device is configured to detect the capacitive signal between the sensing electrode and a conductive object overlying the fingerprint sensing device.

12. The integrated circuit of claim 11, wherein the air gap extends through the passivation layer and exposed to an interconnect dielectric layer of the interconnect structure.

13. The integrated circuit of claim 11, wherein the air gap has a bottom surface lower than a top surface of the interconnect structure and higher than a top surface of a top metal interconnect layer.

14. The integrated circuit of claim 11, wherein the sensing electrode comprises a metal film extending across the air gap.

15. The integrated circuit of claim 14, further comprising:
    a support layer disposed directly under the sensing electrode, comprising silicon dioxide.

16. The integrated circuit of claim 11, further comprising:
    a metal film overlying the interconnect structure, extending along a sidewall surface of the sensing electrode, and further extending on a top surface and the sensing electrode.

17. The integrated circuit of claim 16, wherein the metal film electrically couples the sensing electrode to the CMOS devices through the interconnect structure.

18. A method of forming a fingerprint sensing device, comprising:
    providing a sensing substrate having a plurality of semiconductor devices disposed thereon and configured to receive and process a capacitive signal;
    forming an interconnect structure including a plurality of metal lines and vias within a plurality of inter-metal dielectric layers over the sensing substrate;
    performing a patterning process to form a trench from an upper surface of the interconnect structure; and forming a sensing electrode overlying the trench of the sensing substrate.

19. The method of claim 18, further comprising:

forming a conductive layer over a dummy substrate;

bonding the dummy substrate to the sensing substrate, wherein the conductive layer is bonded between the dummy substrate and the trench of the sensing substrate;

removing the dummy substrate and leaving the conductive layer exposed; and patterning the conductive layer to form the sensing electrode overlying the trench of the sensing substrate.

20. The method of claim 19, further comprising:

forming a passivation layer over the interconnect structure prior to the patterning process;

wherein the passivation layer is directly bonded to the conductive layer by a fusion bonding process.

* * * * *